(12) United States Patent
Ohta

(10) Patent No.: US 8,314,952 B2
(45) Date of Patent: Nov. 20, 2012

(54) PRINT RECORD MANAGEMENT DEVICE, PRINT RECORD MANAGEMENT METHOD, PRINT RECORD MANAGEMENT PROGRAM STORAGE MEDIUM, AND PRINT RECORD MANAGEMENT SYSTEM

(75) Inventor: Mitsuhiko Ohta, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1283 days.

(21) Appl. No.: 11/611,343

(22) Filed: Dec. 15, 2006

(65) Prior Publication Data

US 2007/0263260 A1 Nov. 15, 2007

(30) Foreign Application Priority Data

May 10, 2006 (JP) ................................. 2006-131215

(51) Int. Cl.
*G06F 15/00* (2006.01)

(52) U.S. Cl. ...... 358/1.14; 358/1.16; 382/112; 382/149; 382/236

(58) Field of Classification Search .................. 358/1.14, 358/1.16; 382/112, 149, 236
See application file for complete search history.

(56) References Cited

U.S. PATENT DOCUMENTS

| 7,224,821 | B2 * | 5/2007 | Furukawa et al. | ............. | 382/112 |
| 7,620,232 | B2 * | 11/2009 | Sakai et al. | .................... | 382/141 |
| 2001/0049671 | A1 * | 12/2001 | Joerg | .............................. | 706/50 |
| 2003/0007677 | A1 * | 1/2003 | Hiroi et al. | ..................... | 382/149 |
| 2004/0071353 | A1 * | 4/2004 | Dijk et al. | ...................... | 382/236 |
| 2005/0025368 | A1 * | 2/2005 | Glukhovsky | .................. | 382/236 |
| 2006/0098231 | A1 * | 5/2006 | Konishi | ........................ | 358/3.21 |
| 2008/0002876 | A1 * | 1/2008 | Hiroi et al. | ..................... | 382/144 |

FOREIGN PATENT DOCUMENTS

| JP | 200056936 | 2/2000 |
| JP | 2003330677 | 11/2003 |
| JP | 2004118243 | 4/2004 |
| JP | 2004291290 | 10/2004 |

OTHER PUBLICATIONS

Machine translation of Japanese Patent Document No. 2005-157501, Kato Hiroki, Jun. 16, 2005.*

Machine translation of Japanese Patent Document No. 2003-330677, Tsunoda Masashi, Nov. 21, 2003.*

* cited by examiner

*Primary Examiner* — Mark K Zimmerman
*Assistant Examiner* — Mark Milia
(74) *Attorney, Agent, or Firm* — Gesmer Updegrove LLP

(57) ABSTRACT

A print record management device includes a comparison unit that compares print image data produced on the basis of stored document data with the stored document data, and a determination unit that determines, from a result of the comparison, which of the print image data and association data showing association with the stored document data is to be stored as record data for enabling reproduction of printing processing in relation to the print image data.

19 Claims, 2 Drawing Sheets

PRINT RECORD MANAGEMENT DEVICE, PRINT RECORD MANAGEMENT METHOD, PRINT RECORD MANAGEMENT PROGRAM STORAGE MEDIUM, AND PRINT RECORD MANAGEMENT SYSTEM

PRIORITY INFORMATION

This application claims priority from Japanese Patent Application No. 2006-131215, filed on May 10, 2006.

BACKGROUND

1. Technical Field

The present invention relates to a technique for managing history information on print output, and in particular to a technique for managing image data that enables reproduction of the print output.

2. Related Art

A company or an organization which handles important confidential data may be required to manage history of printing processing carried out by a user so that, should information leak, a follow-up search can be conducted. In history management, in addition to printing attribute information, image data representative of a printed document are accumulated.

The stored image data can be used when the user carries out the printing processing again.

SUMMARY

According to an aspect of the invention, there is provided a print record management device, including a comparison unit that compares print image data produced on the basis of stored document data with the stored document data, and a determination unit that determines, from a result of the comparison, which of the print image data and association data showing association with the stored document data is to be stored as record data for enabling reproduction of printing processing in relation to the print image data.

BRIEF DESCRIPTION OF THE DRAWINGS

Exemplary embodiment(s) of the present invention will be described by reference to the following figures, wherein.

DETAILED DESCRIPTION

Figure 1:
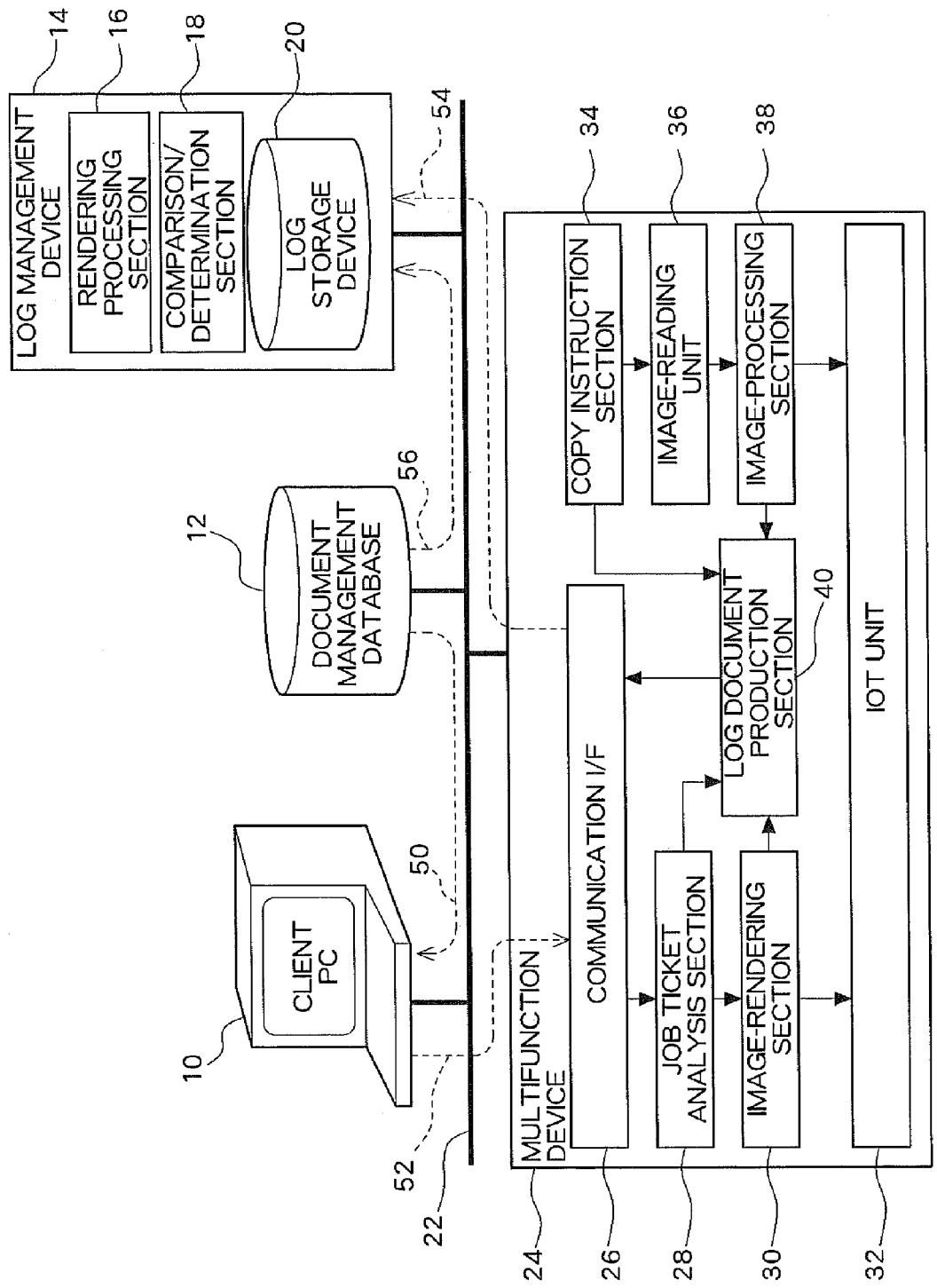
FIG. 1 is a schematic block diagram showing an example structure of a system.

FIG. 1 is a diagram explaining a structure of a system according to an exemplary embodiment. Specifically, to this system, a client PC (a personal computer) 10, a document management database 12, a log management device 14, and a multifunction device 24 are connected via a network 22 such as the Internet.

In printing a document, the client PC 10, or a PC used by a user on a daily basis, obtains (50) the document from the document management database 12, which is a device for storing a document, or stored document data. The client PC 10 can also instruct (52) the multifunction device 24 to print, by means of a job ticket. A job ticket is data containing an instruction requesting printing and print setting information, such as designation of a paper tray, a paper size, a Nup designation, and so forth, and document attribute information, such as the version or URI of a document for printing (the above-described information may hereinafter be referred to as job ticket information). A privileged user can operate the client PC 10 to search for an image log stored in the log management device 14 to carry out a follow-up search in connection with a printed document which has been subjected to a security leak.

The log management device 14 is a device having an operational function as a print record management device and manages records of printing processing carried out in the multifunction device 24. Specifically, the log management device 14 has a rendering processing section 16, a comparison/determination section 18, and a log storage device 20. The rendering processing section 16 and the comparison/determination section 18 are devices for carrying out a predetermined operation, while the log storage device 20 is a device for storing data in a built-in hard disk, a semiconductor memory, or the like.

Log information is input (54) from the multifunction device 24 to the log management device 14. The log information contains a log image produced on the basis of print data, job ticket information relevant to a print instruction, printing attribute information describing a print time, and the like. The rendering processing section 16 specifies the original print document on the basis of the log information, refers (56) to the document management database 12 to obtain the document, and carries out rendering processing in relation to the obtained document on the basis of the job ticket information, the rendering processing being similar to that which is carried out by the multifunction device 24. An example of the rendering process carried out on the basis of the job ticket information may include switching between color and black/white, a Nup process, and the like. With the above, an image similar to the image described by the print image data produced by the multifunction device 24 can be obtained.

Thereafter, the comparison/determination section 18 compares the image obtained in the rendering process and a log image contained in the log information, and determines which of the log image and information showing association with a document stored in the document management database 12 is to be stored as a log relevant to printing (a print log). Then, the log storage device 20 stores the print log determined in accordance with the result of the determination.

The multifunction device 24 is a device having a print function and a scan function. The multifunction device 24 has a communication interface (I/F) 26, a job ticket analysis section 28, an image-rendering section 30, an IOT unit 32, a copy instruction section 34, an image-reading unit 36, an image-processing section 38, and a log document production section 40. The communication I/F 26 is a network interface for exchanging data among the client PC 10, the document management database 12, the log management device 14, and the like. The job ticket analysis section 28 analyzes a job ticket relevant to a printing instruction 52 to thereby obtain job ticket information, such as print-setting information, document attribute information, and so forth.

The image-rendering section 30 converts a document for printing to produce print image data suitable for the process performed by the IOT unit 32. In production of print image data, the print-setting information obtained by the job ticket analysis section 28 is reflected. The IOT unit 32 carries out printing processing on the basis of the print image data input, and outputs a sheet of paper having the results of printing thereon.

The copy instruction section 34 is constructed using a user interface of the multifunction device 24. The user inputs a password into the copy instruction section 34 to thereby log in, and then further inputs an instruction requesting to copy onto the sheet of paper set. The image-reading unit 36 has a scanner, and reads the paper set to thereby produce a scanned image. The image-processing section 38 converts the scanned image into print image data in accordance with the print setting information, and outputs the result to the IOT unit 32.

The log document production section 40 receives the print image data produced by the image-rendering section 30 and the image-processing section 38, and converts the received print image data into a PDF format file. Thereafter, the job ticket information obtained from the job ticket analysis section 28 and the copy instruction section 34 is given to the PDF format file as metadata to produce a log information file. The produced log information file is sent via the communication I/F 26 to the log management device 14.

Figure 2:
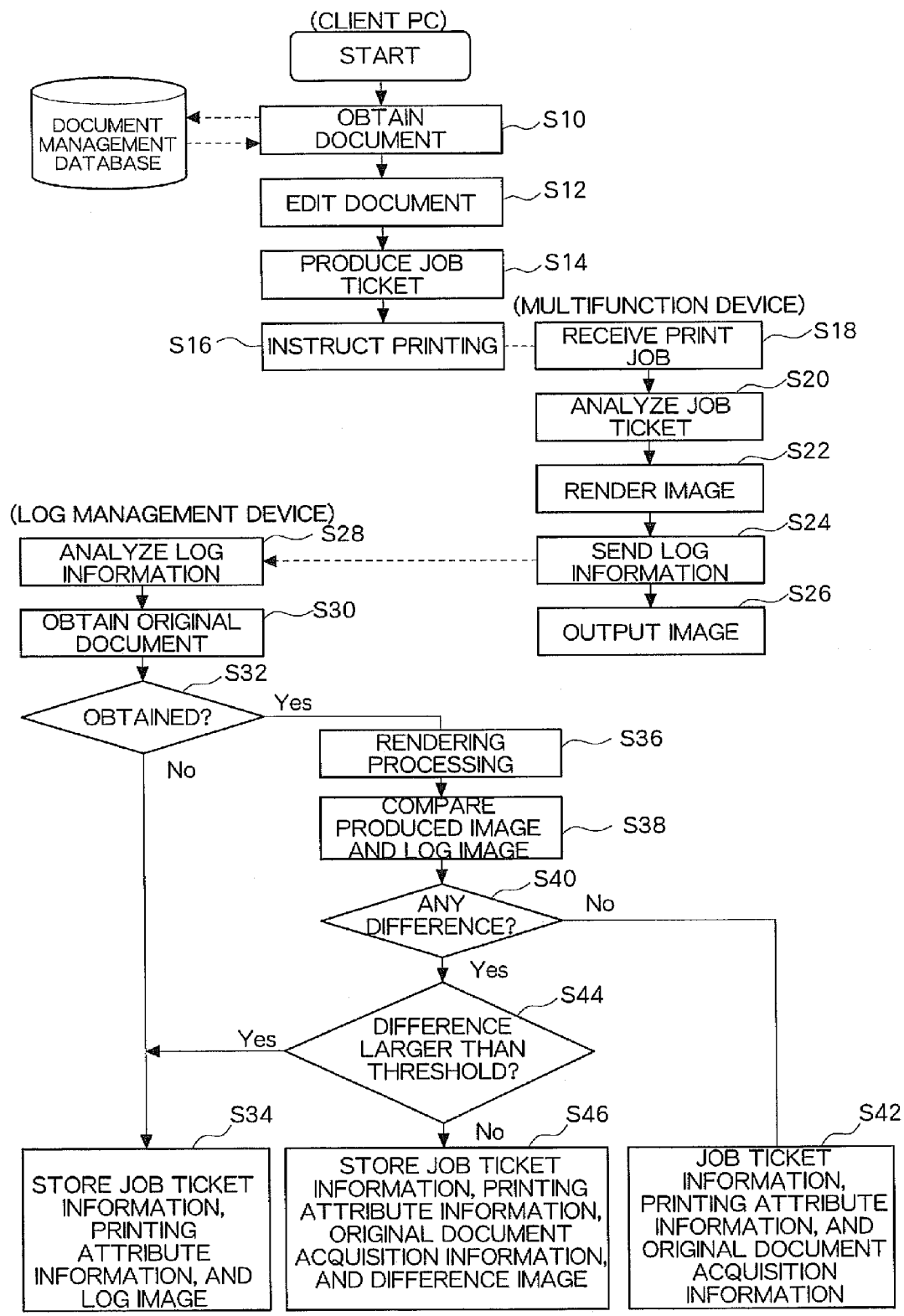
FIG. 2 is a flowchart of a process of storing a log.

In the following, a flow of a process to be carried out by this system will be described with reference to the flowchart of FIG. 2.

Specifically, in response to the user's operation, the client PC 10 obtains a document for printing from the document management database (S10). The user can edit the document when necessary (S12). When the user instructs the print instruction utility in the client PC 10 to print, the print instruction utility produces a job ticket describing job ticket information including print-setting information, document attribute information, and the like (S14). Subsequently, the print instruction utility produces a print job which contains a set having a document and a job ticket, and sends the same to the multifunction device 24 (S16). It should be noted that the client PC 10 may instruct the multifunction device 24 to print, on the basis of a newly produced document or a document obtained via the network 22.

The multifunction device 24 receives the print job (S18), and then extracts a document therefrom and also analyzes the job ticket to obtain job ticket information (S20). Thereafter, in accordance with the job ticket information, the multifunction device 24 converts the document to produce print image data (S22). The produced print image data are put together with the job ticket information and the printing attribute information to thereby produce log information, and sent to the log management device 14 (S24). The multifunction device 24 also outputs a print image based on the print image data (S26). It should be noted that the multifunction device 24 can carry out copying processing in accordance with an instruction sent from the copy instruction section 34. L information is sent to the log management device also in the case of copying.

The log management device 14 initially analyzes the log information received from the multifunction device 24 (S28) to obtain job ticket information and printing attribute information. Thereafter, the log management device 14 obtains the original document from the document management database 12 by reference to the URI and/or the version information contained in the document attribute information in the job ticket information (S30, S32). In the above, it should be noted that the original document may at some times be unobtainable. For example, when a document newly produced by the client PC 10 is printed or a document is copied (scanned and printed) by the multifunction device 24, no information on the original document is available, and, therefore, no original document can be obtained. In this case, the job ticket information, the printing attribute information, and the log image are stored as a print log in the log storage device 20.

Meanwhile, when the original document can be obtained, the rendering processing section 16 carries out a rendering process (S36). The rendering process is a process for producing an image corresponding to the print image data by reference to the job ticket information. With the above, the comparison/determination section 18 can compare the produced image with the log image which serves as print image data (S38). In the comparison, a difference between these images is calculated and evaluated (S40). When there is no difference (that is, zero), the original document acquisition information to be used in obtaining the original document is stored (S42) in the log storage device 20 as a print log together with the job ticket information and the printing attribute information. The original document acquisition information is produced in accordance with the URI of the document attribute information contained in the job ticket information.

Meanwhile, when there is a difference, a determination is made as to whether or not the amount of the difference is larger than a threshold (S44). When it is determined that the amount is larger than the threshold; that is, when a difference between the produced image and the log image is large, a process similar to the process to be carried out when no original document can be obtained is carried out (S34). Specifically, the log image used in printing by the multifunction device is stored in the log storage device 20 as a print log together with the job ticket information and the printing attribute information. Meanwhile, when the amount of the difference is smaller than the threshold, the job ticket information, the printing attribute information, the original document acquisition information, and the difference image are stored as a print log in the log storage device 20 (S46).

As described above, the data to be stored in the log storage device 20 are switched in accordance with the result of comparison between the original document and the log image.

In the following, there will be briefly described an example in which a follow-up search is carried out by means of the print log stored in the log storage device 20 when information is leaked.

When a paper document having a content requiring secrecy printed thereon is unexpectedly found, the print log stored in the log storage device 20 is checked in order to determine the source of the leakage of the information. Then, in the case where the original document of the leaked document cannot be identified, all of the logs stored in the log storage device 20 are checked. That is, a search for the original document is carried out by reference to the original document acquisition information in addition to the log image. Moreover, when necessary, a different image stored together with the original document acquisition information may also be checked.

Meanwhile, when the original document of the leaked document is identified, only the log which contains the original document acquisition information indicating the original document is checked.

In addition, there may be a case where the original document of the leaked document is identified and any modification such as additional characteristic writing or the like is made. In this case, a difference image in the log which contains the original document acquisition information indicating the original document may be mainly checked.

In the following, variations of this exemplary embodiment will be described, and some descriptions may overlap those provided above.

The print record management device may be constructed from hardware having an operational function and software for regulating the operation of the hardware, and may also be constructed as a central processing system using a single piece of hardware or a decentralized processing system using multiple pieces of communicable hardware. Also, the print record management device may have an image production function for producing print image data in accordance with the stored document data, and a print function for printing on a sheet of paper in accordance with the print image data, although these functions may alternatively be provided to an external device instead. Further, the print record management device may have a storage device for storing a portion or all of stored document data, print image data, association data, and the like.

It should be noted that the stored document data referred to here are document data stored or to be stored, and that the document data referred to here refer to various kinds of document data including data comprising characters; data comprising characters, and a drawing or a picture; drawing data; and the like. The document data are generally produced by means of a word processor, a spreadsheet application, and the like, and may be produced, for example, in a format for character array description, such as a text format, a word processor format, or the like, or in an image data description format such as a vector format, a raster format, or the like.

The print image data are data representative of an image to be printed and output, and produced in accordance with the stored document data. The print image data are generally described in a raster format, and used in laser scanning control in printing using an electronic photograph method or in ink scanning control in printing using an ink-jet method. It should be noted that print image data include data which can be considered identical, such as data obtained through conversion of the file format thereof or compression of the print image data.

The comparison unit compares the print image data and the stored document data. In the comparison, data conversion may be applied if necessary in order to conform with the data format, or the like. Then, the determination unit determines the data to store on the basis of a result of the comparison obtained by the comparison unit. That is, the determination unit determines which of the print image data and the association data is to be stored as recording data enabling reproduction of the printing processing relevant to the printed image data (that is, enabling complete or approximate reproduction). It should be noted that the association data referred to here are data for use in obtaining the stored document data; specifically, storage position information (Uniform Resource Identifier) of the stored document data, or the like.

In this example, data to be stored are determined on the basis of the comparison result. Obviously, when printing is carried out directly from the stored document data, the print image data coincide with the stored document data. However, when the stored document data are modified in response to the user's operation and/or setting before printing, the print image data resultantly diverge from the stored document data. Therefore, the degree of divergence between these data is determined through comparison between these data, and a determination is made as to whether the print image data must be stored as record data for enabling reproduction of the printing processing or storing the association data is sufficient.

It should be noted that the processing performed by the comparison unit and the determination unit is not necessarily carried out instantly at the time of printing. For example, there may be carried out a determination as to whether or not it is possible to store the association data instead of the print image data and execution of a process to realize the result of the determination, either at regular intervals, such as during nighttime or on weekends, or irregularly, such as at the time when the storage area runs short, while the print image data are kept stored for a while.

In one example of the print record management device, the comparison unit compares the print image data and the stored document data while reflecting the print-setting image used in the process of production of the print image data. The print setting information as referred to here is the information sent from the print-requesting side to the printing-executing side (for example, from a client to a print server or from a print server to a printer), and specifically setting information for use in controlling a manner of printing. The print setting information is generally described in data called a job ticket. An example of print setting information may include Nup setting, color and black/white setting, enlargement/reduction setting, paper sheet setting, and the like. In this example, for example, a process of producing print image data on the basis of the stored document data is carried out in accordance with the print-setting information, similar to the time when the document data is printed, and the result thereof is compared with the actual print image data.

In another example of the print record management device, the determination unit determines to store the association data when the amount of the difference obtained through the comparison is smaller than a predetermined value. It should be noted that the predetermined value may be determined in consideration of the size of the data to store, reproduction accuracy, and the like. As an example, while the predetermined value is defined as 0, association data are stored when the difference is zero, and document data are stored when the difference is other than zero.

In still another example of the print record management device, a storage instruction unit may be provided for storing difference data indicative of the difference so as to be associated with the association data when the amount of the difference is larger than zero and smaller than a predetermined value. It should be noted that the difference data may be stored in the print record management device.

In yet another example of the recording management device, a storage instruction unit may be provided for storing print setting information used in the process of producing the print image data, so as to be associated with the association data when the determination unit determines to store the association data. That is, incidental information necessary to reproduce the print image data on the basis of the stored document data is additionally stored. When there is any other information necessary for reproduction, such information may also be stored.

A specific example may include a case in which a job ticket is stored with linkage with the association data when the print-setting information is described in the job ticket. It should be noted that in the case where use of the printing processing alone is insufficient to enable complete reproduction of the printing processing, the print-setting information can additionally be stored even when the determination unit determines to store the print image data. Also, in view of the execution of a follow-up search, information on the name of a user or a client who issues the print instruction in question can be stored together with the print image data and the association data.

In yet another example of the print record management device, a specification unit may be provided for specifying the stored document data on the basis of the information given to an instruction requesting printing of the print image data. The information given to the printing instruction referred to here is information described in a job ticket, or the like. For example, stored document data can be specified by reference to the URI of the stored document contained in a job ticket.

In yet another example of the print record management device, there may be provided a specification unit for specifying the stored document data through analysis of the image information on the print image data. The image information referred to here is character or other information to be actually printed. A specific example of the analysis of image information may include a case in which stored document data are specified through character analysis using an OCR or analysis of a buried code (a bar code, a two-dimensional bar code, or the like).

In yet another example of the print record management device, there is provided a modification unit for modifying the associated data, when the determination unit determines to store the association data and the stored document data are thereafter changed, so as to be associated with the stored document data before the change. It should be noted that, on the side where the stored document data are stored, any process, such as copying the stored document data before the change, may be carried out when necessary.

In yet another example of the print record management device, when the print image data have multiple pages, the comparison unit and the determination unit carry out comparison and determination for each of the pages. That is, the stored image is optimized for each page.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with various modifications as are suited to the particular use contemplated. It is intended that the scope of the invention be defined by the following claims and their equivalents.

What is claimed is:

1. A print record management device, comprising:
a comparison unit that compares log print image data associated with a log produced as a result of a stored original document having been rendered by a printing device, the log including printing information, corresponding to the processing of the stored original document by the printing device, and original document acquisition information, and print image data generated by rendering the stored original document using the printing information included in the log; and
a determination unit that causes, when said comparison unit determines that there is a difference between the log print image data and the print image data and the difference is smaller than a predetermined threshold, the printing information, the original document acquisition information, and a difference image to be stored as record data for enabling reproduction of printing processing in relation to the log print image data, the difference image being the determined difference between the log print image data and the print image data.

2. The print record management device according to claim 1, wherein the comparison unit compares the log print image data with the print image data while reflecting print-setting information used in a process of producing the log print image data.

3. The print record management device according to claim 1, wherein said determination unit causes, when said comparison unit determines that there is a difference between the log print image data and the print image data and the difference is greater than the predetermined threshold, the printing information and the log print image data to be stored as the record data for enabling reproduction of printing processing in relation to the log print image data.

4. The print record management device according to claim 1, further comprising a storage instruction unit that stores print-setting information used in a process of producing the log print image data, so as to be associated with the stored record data.

5. The print record management device according to claim 1, wherein said determination unit causes, when said comparison unit determines that there is no difference between the log print image data and the print image data, the printing information, and the original document acquisition information to be stored as the record data for enabling reproduction of printing processing in relation to the log print image data.

6. The print record management device according to claim 1, further comprising a specification unit that specifies the stored original document on the basis of information given to an instruction for requesting printing of the log print image data.

7. The print record management device according to claim 1, further comprising a specification unit that specifies the stored original document through analysis of image information of the log print image data.

8. The print record management device according to claim 1, further comprising a modification unit that modifies the stored record data when the determination unit determines that the stored original document has changed so as to be associated with the stored original document before the change.

9. The print record management device according to claim 1, wherein, when the log print image data and the print image data comprise a plurality of pages, the comparison unit and the determination unit carry out comparison and determination for each of the pages.

10. A print record management method, comprising:
comparing, electronically, log print image data associated with a log produced as a result of a stored original document having been rendered by a printing device, the log including printing information, corresponding to the processing of the stored original document by the printing device, and original document acquisition information, and print image data generated by rendering the stored original document using the printing information included in the log; and
causing, when the comparison determines that there is a difference between the log print image data and the print image data and the difference is smaller than a predetermined threshold, the printing information, the original document acquisition information, and a difference image to be stored, in a data storage unit, as record data for enabling reproduction of printing processing in relation to the log print image data, the difference image being the determined difference between the log print image data and the print image data.

11. A non-transitory computer-readable medium storing a program causing a computer to execute a process for print record management, the process comprising:
comparing log print image data associated with a log produced as a result of a stored original document having been rendered by a printing device, the log including printing information, corresponding to the processing of the stored original document by the printing device, and original document acquisition information, and print image data generated by rendering the stored original document using the printing information included in the log; and
causing, when the comparison determines that there is a difference between the log print image data and the print image data and the difference is smaller than a predetermined threshold, the printing information, the original document acquisition information, and a difference image to be stored as record data for enabling reproduction of printing processing in relation to the log print image data, the difference image being the determined difference between the log print image data and the print image data.

12. A print record management system, comprising:
a processor that compares log print image data associated with a log produced as a result of a stored original document having been rendered by a printing device, the log including printing information, corresponding to the processing of the stored original document by the printing device, and original document acquisition information, and print image data generated by rendering the stored original document using the printing information included in the log;
a determination unit that causes, when said processor determines that there is a difference between the log print image data and the print image data and the difference is smaller than a predetermined threshold, the printing information, the original document acquisition information, and a difference image to be stored as record data for enabling reproduction of printing processing in relation to the log print image data, the difference image being the determined difference between the log print image data and the print image data; and
a storage unit that stores the record data.

13. The print record management system according to claim 12, wherein said processor compares the log print image data with the print image data while reflecting print-setting information used in a process of producing the log print image data.

14. The print record management system according to claim 12, wherein said determination unit causes, when said processor determines that there is a difference between the log print image data and the print image data and the difference is greater than the predetermined threshold, the printing information and the log print image data to be stored as the record data for enabling reproduction of printing processing in relation to the log print image data.

15. The print record management system according to claim 12, further comprising a storage instruction unit that stores print-setting information used in a process of producing the log print image data, so as to be associated with the stored record data.

16. The print record management system according to claim 12, wherein said determination unit causes, when said processor determines that there is no difference between the log print image data and the print image data, the printing information and the original document acquisition information to be stored as the record data for enabling reproduction of printing processing in relation to the log print image data.

17. The print record management system according to claim 12, further comprising a specification unit that specifies the stored original document on the basis of information given to an instruction for requesting printing of the log print image data.

18. The print record management system according to claim 12, further comprising a specification unit that specifies the stored original document through analysis of image information of the log print image data.

19. The print record management system according to claim 12, further comprising a modification unit that modifies the stored record data when the determination unit determines that the stored original document has changed so as to be associated with the stored original document before the change.

* * * * *